Feb. 19, 1952 J. B. WILSON 2,586,281
MACHINE FOR DELIVERING ARTICLES SERIALLY
Filed March 4, 1949 2 SHEETS—SHEET 2
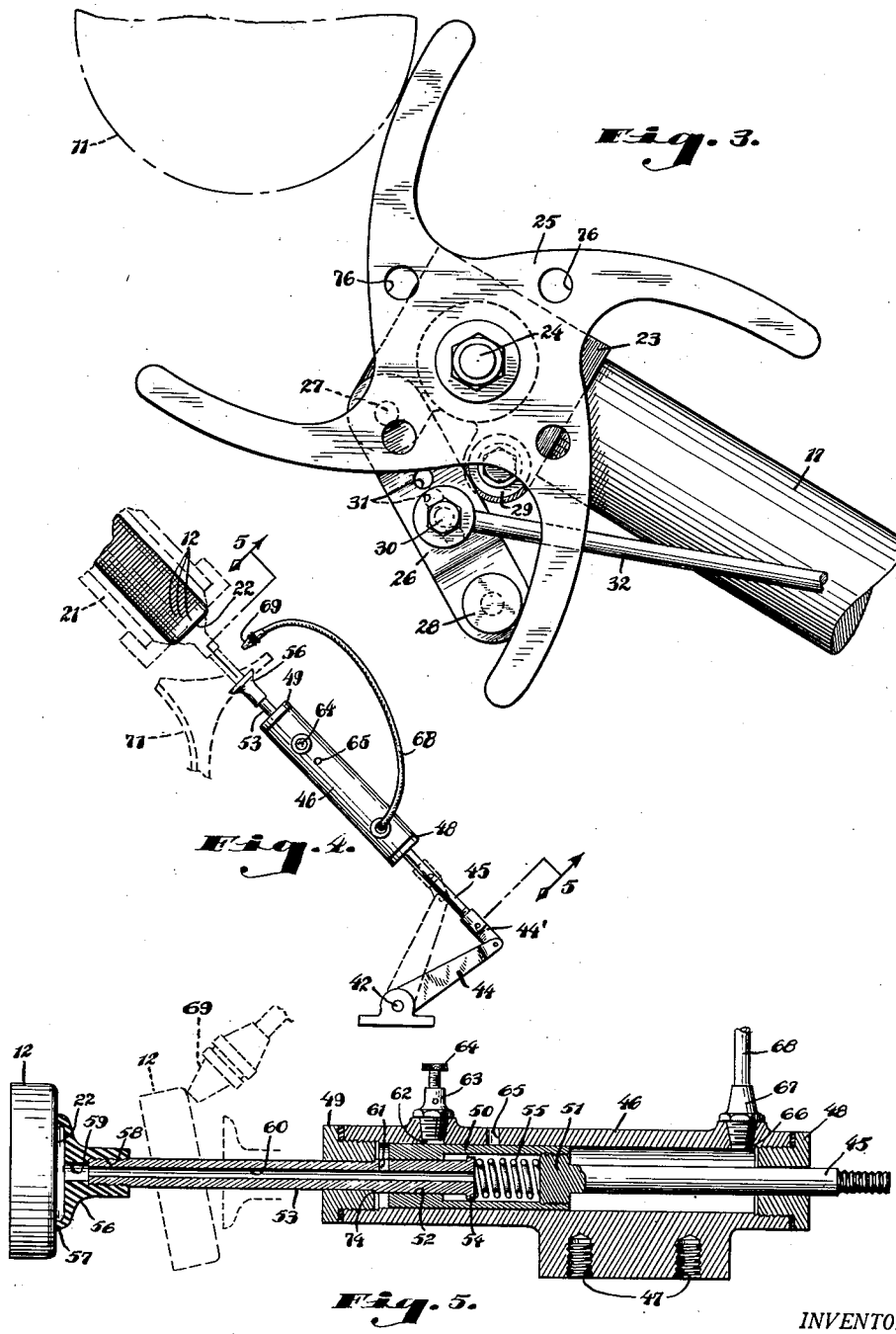
INVENTOR.
JOHN B. WILSON,
BY: Harold B. Hood
ATTORNEY.

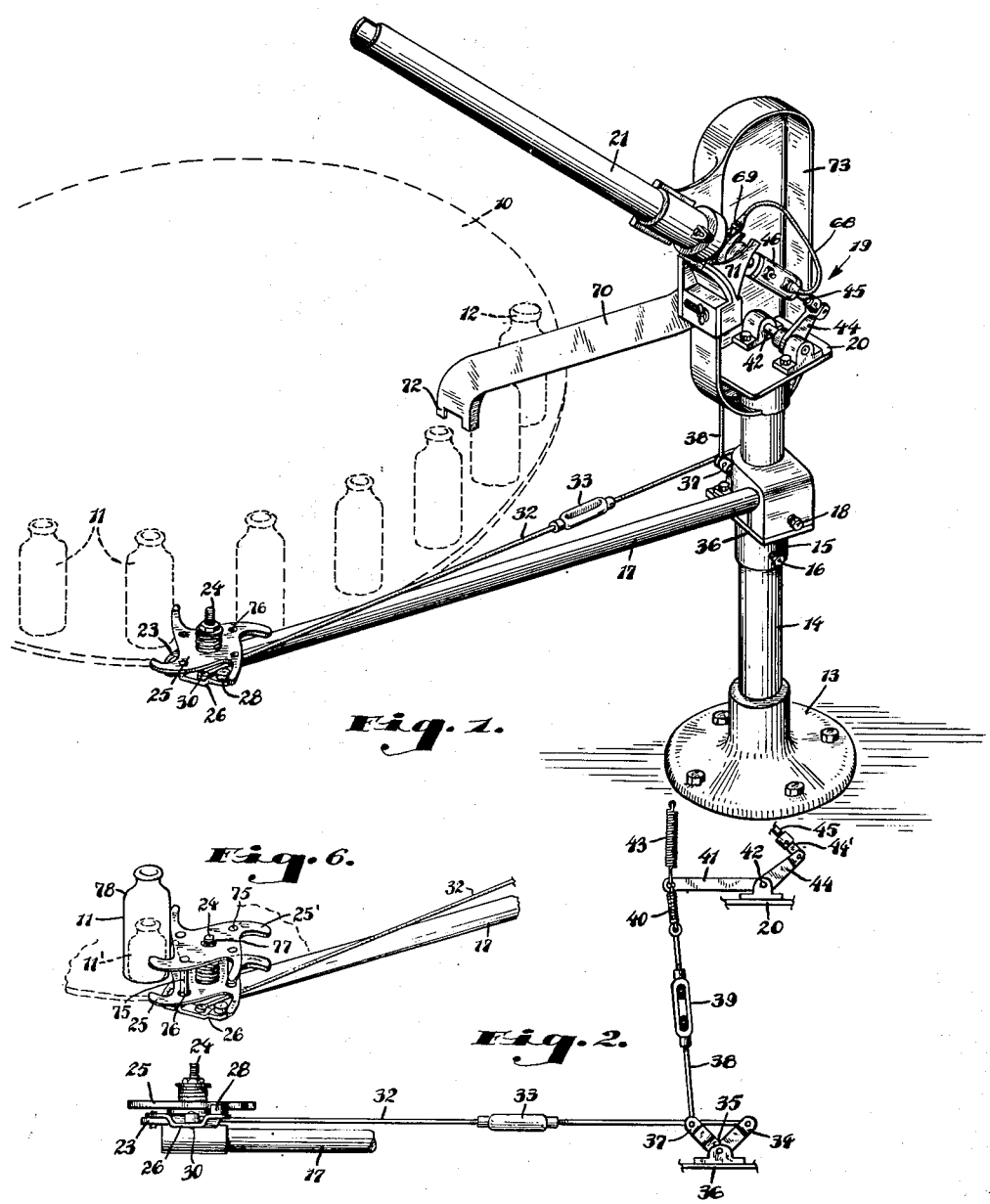

Patented Feb. 19, 1952

2,586,281

UNITED STATES PATENT OFFICE 2,586,281

MACHINE FOR DELIVERING ARTICLES SERIALLY

John B. Wilson, Indianapolis, Ind., assignor to Basca Manufacturing Co., Inc., Indianapolis, Ind., a corporation of Indiana Application March 4, 1949, Serial No. 79,696

17 Claims. (Cl. 226—88.1)

The present invention relates to a machine for delivering articles serially. The invention finds particular utility in an arrangement for delivering cup-shaped hoods from a magazine, in which a stacked supply of such hoods is retained, to milk bottles, or the like progressing, serially, upon a transfer device toward a capping mechanism; and therefore it has been illustrated, and will be described, in that environment. The invention, however, is of much broader utility, and is claimed generally, so that it will be understood that I do not intend my invention to be limited beyond the scope defined in the claims appended hereto.

The primary object of the invention is to provide a device which, being actuated by the movement of articles upon a transfer device, will operate to evacuate a vacuum cup, after pressing that cup against an article to be withdrawn from a magazine, and will then transport that article to a location from which it can be discharged to a delivery chute, breaking the vacuum and directing a spurt of air under pressure against the article to direct it to, and into, the delivery chute. A further object of the invention is to provide a device of the character described in which the mechanical means for reciprocating the vacuum cup includes pump mechanism so constructed and arranged as to produce and break the necessary vacuum at proper times in the cycle of operation of the device, and to compress and discharge a stream of air, as above described, thereby obviating the necessity for the provision of external vacuum or pressure pumps. A further object of the invention is to provide an actuating mechanism for effecting such reciprocation of a character such as to impart to the moving bottles a sufficient mechanical advantage over the pump mechanism to insure against displacement of the bottles relative to the transfer device upon which they are carried. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a perspective view of a machine embodying my invention, shown in association with a more or less diagrammatic representation of a transfer device;

Fig. 2 is an elevation of the mechanical means for actuating the picker mechanism;

Fig. 3 is an enlarged, fragmental plan view of the power-receiving end of the driving mechanism;

Fig. 4 is a fragmental elevation of a picker mechanism;

Fig. 5 is an enlarged longitudinal section taken substantially on the line 5—5 of Fig. 4; and Fig. 6 is a more or less diagrammatic perspective view showing an adapter which may be desirable for use with relatively tall bottles.

Referring more particularly to the drawings, it will be seen that I have indicated at 10 a rotary transfer table upon which articles, such as milk bottles 11, may be serially transported from one station or machine to another as, for instance, from a filling station to a capping station. At the illustrated station, which may be also the filling station, caps or hoods 12 are loosely dropped upon the bottles, to be crimped in place at the capping station (not shown).

Adjacent the table 10, a pedestal 13 supports a post 14 upon which is mounted, for vertical and rotary adjustment, a bracket 15 adapted to be secured in adjusted position upon said post by one or more set screws 16 or other equivalent fastening means. A boom 17 is supported upon the bracket 15, and is adapted to be locked in suitable adjusted position relative to said bracket by one or more set screws 18, or other equivalent fastening means. The picker mechanism of the present invention, indicated generally by the reference numeral 19, is supported at the upper end of the post 14 and includes a base plate 20 and a support for a magazine 21. As is more clearly illustrated in Fig. 4, the magazine 21 is so constructed as to retain a plurality of caps or hoods 12, in stacked relation, and in such a manner that a surface 22 of the cap at one end of the stack is always exposed. Suitable means, well known to the art and therefore not illustrated in detail, is provided at the lower end of the magazine to retain the stack in place, but to yield, when a withdrawing force is applied to the exposed cap, to permit withdrawal of that cap while retaining the remainder of the stack.

At its outer end, the boom 17 supports a horizontal plate 23 from which projects upwardly a journal pin 24 upon which a star wheel 25 is mounted for rotation. The boom is so positioned that successive fingers of the star wheel 25 will project into the paths of successive bottles 11 on the transfer table 10, as said table roates, whereby the star wheel 25 will be turned through 90° by each successive bottle as it passes the star wheel.

Pivotally mounted upon the plate 23 is an arm 26 supporting, at its outer end, a roller 28 which, as is most clearly to be seen in Figs. 1 and 3, is disposed in the paths of the fingers of the star wheel 25. It will be readily perceived that, as the star wheel 25 is turned through 90° in a clockwise direction, as viewed in Fig. 3, the arm 26 will be swung to a lesser degree in a clockwise direction about its pivot 27, the path of the roller 28 being such as to cause said roller to escape beyond the extremity of the cooperating finger shortly before that finger completes its movement through an arc of 90°.

A bumper 29, which will preferably be a rubber ring mounted upon a suitable stud fixed to the plate 23, is disposed in the return path of the arm 26 to limit counterclockwise movement of said finger.

A pin or screw 30 is secured to the arm 26 intermediate the ends thereof, and provides a pivotal connection between said arm and a link 32. Preferably, but not necessarily, a turn buckle 33 is connected between the ends of said link 32, the opposite end of said link being connected to one arm 34 of a bell crank lever 35 suitably mounted for oscillation upon the base plate 36 of the bracket 15. To the other arm 37 of said lever is connected one end of a second link 38, preferably including a turn buckle 39, the other end of said link 38 being connected, through a spring 40, with a lever 41 fixed on a rock shaft 42 journalled in suitable bearings on the plate 20. A further spring 43, having one end suitably anchored on the frame of the mechanism 19, is connected to the lever 41 to resist resiliently any movement of the arm 26 in a clockwise direction from its position illustrated in Fig. 3.

It will be readily apparent that a substantial force must be exerted to rock the shaft 42 against the resistance of the spring 43; and the particular mechanism disclosed herein for receiving force from successive bottles 11 and transmitting it to the shaft 42 is considered to be of substantial importance. The relationship between the number, length, spacing and contour of the star wheel fingers, the location of the pivot 27 relative to the wheel axis, the distance between the pivot 27 and the pin 30 and that between said pivot and the roller 28, are all factors in providing the necessary mechanical advantage between the bottles and the shaft 42 to guard against the possibility of displacing or dislodging the bottles relative to the transfer device 10 during operation of the machine. One preferred set of numerically defined dimensions will be disclosed hereinafter, though it may be broadly stated that the actuating mechanism will be so devised, arranged and proportioned as to make it possible for the bottles, travelling with device 10, to deliver to the power-receiving end of the transmitting train, sufficient force to actuate the mechanism next to be described, without danger of displacement or dislodgement of the bottles relative to the transfer device on which they are travelling.

A lever 44 fixed to the rock shaft 42 has its free end suitably connected through a link 44' with the projecting end of a piston rod 45.

A cylinder 46 (Figs. 1 and 5) is provided with screw sockets 47 through the medium of which said cylinder is mounted upon the frame of the mechanism 19 in axially aligned, suitably spaced relation to the magazine 21. The open ends of the cylinder 46 are adapted to be closed by removable heads 48 and 49, the piston rod 45 being slidably mounted in an axial bore in the head 48. Reciprocably mounted in the cylinder 46 is a hollow piston 50, one end of which is closed by a plug 51, shown as integral with the rod 45, whereby said piston is operatively connected to said rod. At its other end, the piston is formed with a bore 52 in which is slidably received a reciprocator 53 whose enlarged head 54 is received within the hollow piston body and cooperates therewith to limit separating movement of the reciprocator 53 with respect to the piston 50. A spring 55 is confined, within the hollow piston body, between the plug 51 and the reciprocator head 54, resiliently urging said reciprocator toward such separating movement.

The reciprocator 53 is slightly reduced near its headed end to define a stop shoulder 74; and the reduced portion of said reciprocator is mounted to slide in an axial bore in the cylinder head 49. Upon its end remote from the piston 50, the reciprocator threadedly supports a suction cup 56, which may preferably be made of rubber or some suitable substitute therefor, and which is formed to provide a resiliently flexible perimetral lip 57. The threaded end of the reciprocator 53 is threadedly engaged in a socket 58 in the stem of the cup 56; and said cup is provided with a passage 59 providing communication between the interior of said cup and a longitudinal passage 60 in the reciprocator 53, which passage communicates with the interior of the hollow piston body. A radial port 61 opens from said passage 60 into the interior of the cylinder 46.

Adjacent the end of the cylinder 46 closed by the head 49, said cylinder is provided with a radial bleed port 62. For reasons which will appear, I prefer to provide means for controlling the rate of flow of fluid through the bleed port 62, and, in the illustrated embodiment of the invention, such means comprises a valve fitting 63 threaded into the port 62 and providing an adjustable needle valve 64. At a point somewhat more remote from the head 49, the cylinder is provided with a radial relief port 65. As is clearly to be seen from an inspection of Fig. 5, the piston 50 will mask and close the ports 62 and 65 against fluid flow therethrough throughout a major portion of the stroke of said piston.

Near that end of the cylinder closed by the head 48, the cylinder is provided with a further radial port 66 into which is threaded a connector fitting 67 carrying a conduit 68 which will preferably be flexible copper tubing. At its remote end, the conduit 68 carries a nozzle 69, which, as is clearly shown in Figs. 1, 4 and 5, is positioned adjacent the path of the cup 56 and in the path of a cap 12 supported upon said cup as the cup is retracted from the magazine. The direction in which the nozzle 68 is pointed can be varied by bending the tube 68; but I presently prefer that the tube shall be so directed that a stream of air emanating therefrom will strike the surface 22 of a cap supported on the cup 56, and will flow into the mouth 71 of a chute 70, whose tail or discharge end 72 is located for successive registration with the bottles 11 as they pass the illustrated station.

Preferably, a two-part housing 73 (one part only of which is illustrated) will be provided to enclose the operating parts of the picker mechanism 19.

The operation of the disclosed mechanism will be clear from the above description. The parts will normally rest in the positions illustrated in solid lines in Figs. 1 to 4. As the table 10 rotates in a counter-clockwise direction, a bottle will engage one finger of the star wheel 25 to turn such wheel through 90°. At the beginning of that motion, the arm 26 will swing in a clockwise direction about its pivotal mounting 27, thereby shifting the link 32 toward the left to rock the shaft 42 and lever 44 in a counter-clockwise direction. Thereby, the piston 50 will be moved from the righthand end of the cylinder 46, as viewed in Fig. 5, toward the position illustrated in that figure. Shortly before said piston reaches its illustrated position, the lip 57 of the cup 56 will engage the exposed face 22 of the endmost cap 12 in the magazine 21, and almost concurrently therewith, the shoulder 74 will engage the inner end of the head 49, whereby further advancement of the reciprocator 53 will be arrested, while the piston 50 continues to move forward, compressing the spring 55 in the manner illustrated. Such movement of the piston 50 relative to the reciprocator 53 will compress the air in the lefthand end of the cylinder, forcing that air to flow through the port 61 and passages 60 and 59 into the interior of the cup 56, and flexing the lip 57, to escape between said lip and the surface 22. The lip 57 is constructed, in a manner well known in the art, to flex readily under the influence of a superatmospheric pressure therewithin, but to resist flexure inwardly.

As the piston 50 attains the position illustrated in Fig. 4, the roller 28 escapes the cooperating star wheel finger, and the spring 43 will return the linkage, moving the lever 44 in a clockwise direction to shift the piston rod 45 toward the right as viewed in Fig. 5. Initial movement of the piston 50 toward the right leaves the reciprocator 53 stationary, until said piston engages the head 54. Thereby, the chamber comprising the lefthand end of the cylinder, the port 61, the passages 60 and 59, and the interior of the cup 56, is increased in volume to establish a subatmospheric pressure therein; and as the reciprocator 53 begins to move with the piston, that cap whose surface 22 is engaged by the cup will be withdrawn from the magazine.

As the lefthand end of the cylinder clears the port 62, air will flow into that variable volume chamber at a rate depending upon the setting of the needle valve 64. So long as the piston 50 fits tightly within the cylinder 46, a substantial degree of bleed through the port 62 is necessary in order to prevent the creation of so high a degree of vacuum within the cup 56 as to deform the surface 22 of the engaged cap 12; but, as the piston begins to wear, after continued use, the needle valve 64 will be periodically progressively adjusted to decrease the rate of bleed until finally the leakage past the piston becomes greater than the initial rate of bleed through the needle valve, whereupon it will be necessary to replace the piston. The provision of the needle valve substantially increases the effective life of the pump assembly as a whole.

It will be obvious that the arrangement whereby a vacuum is drawn in the above-described variable-volume chamber during retraction of the piston, resists the force of the spring 43, and thereby retards movement of the piston. Even moving slowly, however, the piston will compress the air in the righthand end of the cylinder and will force a stream of air to move through the conduit 68 and nozzle 69. When the lefthand end of the piston clears the relief port 65, the vacuum will be suddenly broken, and the remainder of the return stroke of the piston, and its connected linkage, will be rapid, whereby a sharp spurt of air will be forced through the nozzle 69. Substantially concurrently with the clearing of the port 65, the cap 12 will come into engagement with the nozzle 69, in the manner indicated in dotted lines in Fig. 5. Thus, as the vacuum holding the cap in place on the cup 56 is broken, the cap will tend to drop by gravity away from the cup; the cap will come into mechanical engagement with the nozzle 69, whereby its further movement with the cup is arrested, and a sharp spurt of air, emanating from the nozzle 69, will strike the surface 22, tending to blow the cap away from the cup and toward and into the mouth 71 of the chute 70.

As has been stated hereinabove, the dimensions and relative proportions of the actuating mechanism for the piston rod have been found to be of some importance. I prefer to install my mechanism very close to the filling station in dairy plants, so that a cap or hood will be dropped onto each bottle immediately after the filler valve has been withdrawn from the bottle in order to minimize the possibility of contamination of the bottle pouring lip. Preferably, the chute tail 72 will be so close to the filling station that each bottle will engage, actuate, and leave the cooperating star wheel finger during engagement of the standard filling valve (not shown) with that bottle. Such an arrangement, of course, is of further advantage in that the engagement of the filling valve with the bottle lends increased stability to the bottle to reduce the possibility that the bottle might slip relative to the transfer device 10, or be overturned or dislodged as a result of the resistive effect of the cooperating star wheel finger.

While I do not intend thereby to be limited to particular numerical dimensions or relationships, I have found the following specific dimensions to be admirably adapted to use in the handling of caps or hoods for standard glass milk and cream bottles in capacities varying from one-half pint to one quart, and I believe that the same dimensions may be used to handle similar bottles up to one gallon capacity. For handling containers of differing shapes, sizes, or materials, different specific dimensions may be desirable, though I believe that relative proportions will remain substantially constant. Further, while I have shown and particularly described a star wheel having four uniformly spaced fingers, it will be apparent that fewer fingers or more fingers might be arranged on the star wheel; and that, while uniform peripheral spacing thereof will usually be desirable, it is conceivable that, in some particular installation, a non-uniform spacing would be preferable.

In the illustrated, and preferred, embodiment of the invention, then, the radially extreme ends of the fingers of the star wheel are angularly spaced 90° from each other and extend $5\frac{5}{16}$ inches radially from the center of the post 24, the tips of said fingers being rounded off on a $\frac{5}{16}$ inch radius. The trailing edge of each finger, adapted to be operatively engaged by a bottle, is curved outwardly in the direction of operative rotation of the star wheel, upon an arc of a circle having an 8 inch radius; while the leading edge of each finger constitutes a circular arc struck on a radius of 7⅜ inches. The center of the post 24 is so positioned relative to the path of bottles on the table 10 that each advancing bottle first strikes a cooperating finger at a point approximately 4 inches radially displaced from the center of said post 24.

The center of the pivot 27 lies 1½ inches from the center of the post 24, and the axis of the roller 28 is 4 inches from said pivot 27, the diameter of the roller 28 being ¾ inch. The axis of the pin 30 is located 2½ inches from the pivotal axis 27 and 1½ inches from the axis of the roller 28. With these proportions, the roller 28 will escape each cooperating finger of the star wheel after the lever 26 has been moved thereby through a 70° arc.

The above arrangement has been found to be operatively effective for use between most standard filling and capping stations in usual dairy installations, and, once the proper relationship has been established, it is ordinarily unnecessary and undesirable to make any changes. However, an occasional installation will be found to be of such character as to provide an unusually stable or an unusually unstable seat for bottles on the transfer device with which my machine is to be associated; and, in order to accommodate such variable conditions, I may form the lever 26 with a plurality of openings 31 with which the pin or screw 30 may be selectively associated. Obviously, if bottles are unusually stable on a transfer device, the pin 30 may be shifted to a position more remote from the pivot 27, thereby elongating the effective stroke of the piston 50; while if the bottles are unusually unstable, for one reason or another, the pin 30 may be shifted to a position closer to the pivot 27, thereby reducing the resistance to rotation of the star wheel offered by the lever 26 and the associated linkage.

From an inspection of Fig. 6 it will be seen that, if the machine of the present invention is to be used with standard half-pint bottles, such as shown at 11', the star wheel fingers must be located at a level fairly close to the transfer device. When handling such bottles, the fingers engage the bottles about half way between the transfer device and the level at which the filler valve engages the bottle mouth, and no trouble is encountered. When, however, taller bottles, such as those of quart capacity indicated at 11 are used, the level of engagement of the fingers with the bottles is much closer to the usually smooth and frequently wet and slippery table surface than to the bottle mouth which is firmly engaged by the filler valve; and a bottle is sometimes "tripped" by a finger, the movement of its bottom being arrested while its mouth is carried on by the filler valve, whereby the bottle is overturned.

To guard against such mishaps, I may provide a second star wheel 25' identical in shape with the wheel 25. Dowel pins 75, dependent from the wheel 25' enter openings 76 in the wheel 25, and a central opening 77 sleeves on the post 24, whereby the wheel 25' is spaced from the wheel 25 but connected to rotate in absolute registry therewith. The wheel 25' is so located that its fingers will engage bottles of, for instance, quart capacity just below the shoulders 78 thereof so that, in case the bottom of a bottle should tend to slip, under the resistive effect of the wheel 25, the wheel 25' will immediately assume the load and, being so close to the bottle mouth which is firmly supported by the filler valve, will carry the wheel 25 on to the point at which the bottle will escape therefrom.

I have found that the present device operates unfailingly and with high efficiency, drawing its entire operative power from the table 10, and requiring no supply of pressure or vacuum, although both vacuum and pressure are produced and utilized in the organization. The spring 40, of course, is provided in order to prevent the possibility of damage to the mechanism in case of obstruction of the movement of the reciprocator 53.

I claim as my invention:

1. In a device of the class decribed, a cylinder, a piston mounted for reciprocation in said cylinder, stem means associated with said piston and projecting from said cylinder, a reciprocator having a lost-motion mechanical connection with said piston, a cup having a flexible perimetral lip carried on said reciprocator outside said cylinder, said reciprocator providing a passage always communicating with the interior of said cup and with the interior of said cylinder, a bleed port in said cylinder, a relief port in said cylinder axially spaced from said bleed port, said piston being arranged to mask and close said bleed port and said relief port at times and to open said bleed port prior to opening said relief port as said piston moves in a direction to shift said cup toward said cylinder, and means cooperating with said stem means to reciprocate said piston.

2. The device of claim 1 including valve means associated with said bleed port and adjustable to control variably the rate of fluid flow through said bleed port.

3. The device of claim 1 in which said bleed port and said relief port are both located near one end of said cylinder and in which said cylinder is provided with a further, constantly-open port near its opposite end, said device further including a nozzle located adjacent the path of said cup, and conduit means connecting said nozzle with said constantly-open port.

4. For use with a transfer device for carrying articles serially past a station and a magazine containing stacked elements to be associated serially with said articles, said magazine always exposing a surface of one of said elements at an end of the stack, a chute having a tail located adjacent the path of such articles and a mouth located near said magazine, a vacuum cup, a reciprocator carrying said cup and reciprocable to move said cup past said chute mouth and into engagement with the exposed surface of an element in said magazine, pump means operable to reciprocate said reciprocator and to evacuate said cup during such engagement, and mechanical means connected to drive said pump means, said mechanical means including a power-receiving element located in the path of articles on said transfer device to be shifted thereby and means for returning said power-receiving element after passage of an article.

5. A device of the class described comprising a pump cylinder having a substantially radial relief port near one end thereof and a second port near the other end thereof, a piston reciprocably mounted in said cylinder, said piston masking and closing said relief port during a major portion of its stroke, a reciprocator connected to be reciprocated by said piston, a vacuum cup carried at that end of said reciprocator remote from said piston, said reciprocator being provided with a passage establishing communication between the interior of said pump cylinder and the interior of said cup throughout the active cycle of the piston, and mechanical means for reciprocating said piston.

6. The device of claim 5 in which one end of said piston is provided with an axial bore in which said reciprocator is axially slidably received.

7. The device of claim 6 including means limiting axial separating movement of said reciprocator relative to said piston, and spring means urging such separating movement.

8. The device of claim 5 in which said cylinder is further provided with a substantially radial bleed port located between said relief port and said one end of said cylinder.

9. The device of claim 8 in which said piston masks and closes said bleed port during a portion of its stroke.

10. The device of claim 9 including valve means dominating said bleed port and adjustable to control variably the rate of fluid flow therethrough.

11. The device of claim 5 in which said cylinder is further provided with a substantially radial bleed port located between said relief port and said one end of said cylinder, and including valve means dominating said bleed port and adjustable to control variably the rate of fluid flow therethrough.

12. In a device of the class described, for use with a transfer device adapted to carry articles serially past a station, a pump comprising a cylinder and a piston reciprocably mounted therein, a lever operatively connected to reciprocate said piston upon oscillation of said lever, and means for operating said lever comprising a star wheel having fingers arranged to move in a path intersecting the paths of articles carried on said transfer device, a second lever having one end pivotally mounted at a point within the orbit of said fingers but eccentric to said wheel, means carried by said lever and swingable with said lever in a path one end of which is within the paths of said fingers and the other end of which is radially outside said lever paths, linkage means connecting said second lever with said first lever, and means resiliently resisting movement of said levers in one direction.

13. The device of claim 12 in which the fingers of said star wheel are curved outwardly in the direction of rotation of said wheel under the influence of such articles.

14. The device of claim 12 in which said linkage means is connected to said second lever at a point between the pivotal mounting of said second lever and said means carried by said lever.

15. In combination, a transfer device for moving articles relative to a station, a magazine containing stacked elements to be associated serially with said articles, said magazine always exposing a surface of one of said elements at an end of said stack, picker mechanism including a cup having a flexible lip and movable toward said magazine and into engagement with said exposed surface, and away from said magazine, said picker mechanism further including a vacuum pump, the interior of said cup having communication with said pump and said cup acting, after such engagement with said exposed surface of an element in said magazine, to withdraw the engaged element from said stack, actuating means for said picker mechanism including a member disposed in the path of such articles, said articles successively engaging said member to move the same as said articles move relative to said station, to transmit the entire actuating power to said picker mechanism, and means operatively connecting said member to drive said pump to evacuate said cup upon such engagement and prior to movement of said cup away from said magazine.

16. In a device of the class described for use with a magazine containing stacked elements, said magazine always exposing a surface of one of said elements at an end of said stack, a pump including a cylinder mounted adjacent said magazine, and a piston mounted for reciprocation in said cylinder, stem means associated with said piston and projecting from said cylinder, a reciprocator having a lost-motion mechanical connection with said piston and movable toward and away from said magazine end generally in alignment therewith, a cup having a flexible perimetral lip carried on said reciprocator and presented toward said exposed surface, said reciprocator providing a passage always communicating with the interior of said cup and with the interior of said cylinder, a relief port in said cylinder, said port being closed during a portion of the stroke of said piston as said piston and said reciprocator move away from said magazine and opening communication between the interior of said cylinder and the atmosphere before the piston completes such stroke, and means cooperating with said stem means to reciprocate said piston.

17. The device of claim 16 including a bleed port in said cylinder, and means for variably controlling the effective capacity of said bleed port, said bleed port being opened, during movement of said piston and reciprocator away from said magazine, prior to opening of said relief port.

JOHN B. WILSON.

REFERENCES CITED

The following references are of record in the file of this patent:

UNITED STATES PATENTS

| Number | Name | Date |
|---|---|---|
| 660,913 | MacKirdy | Oct. 30, 1900 |
| 1,063,037 | Jones | May 27, 1913 |
| 1,123,348 | Minnick | Jan. 5, 1915 |
| 1,658,837 | Derby | Feb. 14, 1928 |
| 1,788,228 | Berkenvelder | Jan. 6, 1931 |
| 2,002,213 | Adams | May 21, 1935 |
| 2,047,846 | Wright et al. | July 14, 1936 |
| 2,059,546 | Brandenburg | Nov. 3, 1936 |
| 2,074,815 | Tavender et al. | Mar. 23, 1937 |
| 2,304,146 | Brinton | Dec. 8, 1942 |
| 2,349,523 | Sonnenberg | May 23, 1944 |
| 2,361,176 | Carvey | Oct. 24, 1944 |
| 2,397,297 | Sonnenberg | Mar. 26, 1946 |
| 2,417,938 | Krueger | Mar. 25, 1947 |